Patented Feb. 28, 1933

1,899,122

UNITED STATES PATENT OFFICE

RICHARD TOBLER, OF BASEL, AND WALTER KERN, OF SISSACH, SWITZERLAND, ASSIGNORS TO THE FIRM SOCIETY OF CHEMICAL INDUSTRY IN BASLE, OF BASEL, SWITZERLAND

MANUFACTURE OF DYESTUFFS OF THE POLYMETHINE SERIES

No Drawing. Application filed May 17, 1929, Serial No. 363,989, and in Switzerland May 19, 1928.

The present invention relates to the manufacture of dyestuffs of the polymethine series.

Hitherto the manufacture of dyestuffs of the polymethine series has inter alia been performed by condensing cyclic ammonium salts with salts or with ortho-esters of formic acid.

The subject-matter of the present invention consists in a process in which, in a first phase, two molecular proportions of a methylene base of the general formula

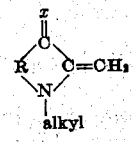

wherein R stands for an aryl residue which may be substituted, and $x$ stands for two hydrogen atoms which may be replaced by two monovalent hydrocarbon residues, such as alkyl, aralkyl and aryl, are condensed with one molecular proportion of formaldehyde, and, in a second phase, the condensation product of the general formula

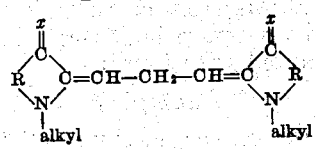

wherein the two R's stand for two aryl residues which may be substituted, and the two $x$'s stand for two hydrogen atoms each, which may be replaced by two monovalent hydrocarbon residues, such as, alkyl, aralkyl and aryl, is oxidized in a medium the pH of which is smaller than 7.

As oxidation agents all such agents come into consideration, viz. air or oxygen, silver acetate, lead peroxide, nitrosobenzene, particularly however quinones, such as naphthoquinone, chloranil and benzoquinone.

The following examples illustrate the invention, the parts being by weight:—

Example 1

41.6 parts of 1:3:3-trimethyl-2-methyleneindolin of the formula

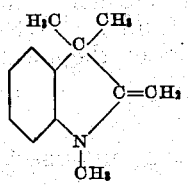

are dissolved in 120 parts of alcohol and the solution is mixed at the ordinary temperature with 10 parts of a solution of formaldehyde of 38 per cent. strength. The temperature soon begins to rise; the whole is stirred at a temperature of 30–35° C., whereupon a white crystalline precipitate is formed. After some hours the reaction is complete and the mass has become a thick magma. It is cooled, filtered, and the solid product of the formula

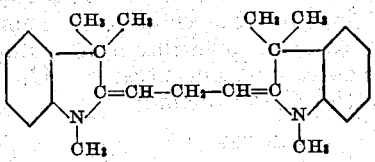

is washed with alcohol. By recrystallization from methyl alcohol there are obtained white needles which melt at 124° C. and become colored on exposure to air owing to the formation of a red basic dyestuff.

The condensation of formaldehyde can also be carried out without a diluent or solvent.

In an analogous manner the reaction may be carried out with other methylene bases, for example those which are derived from trimethylindoleninium salts, which themselves are obtained from ortho- or para-toluidine or from other substitution products or homologues of aniline, or of the naphthylamines.

Example 2

223 parts of 1:3:3-trimethyl-2-methylene-β-naphthindolin of the formula

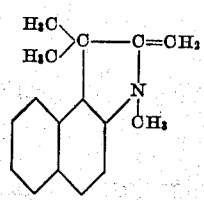

are dissolved in 2500 parts of alcohol and mixed with 60 parts of formaldehyde of 37 per cent. strength. The reaction mixture is kept at a temperature of 40° C. for 17 hours while stirring, whereupon the methylene-di-1:3:3-trimethyl-2-methylene-β-naphthindolin separates as a white mass in very good yield. By recrystallization from alcohol and benzene it is obtained in colorless crystals which melt at 220-225° C.

Example 3

7.2 parts of the condensation product from formaldehyde and 1:3:3-trimethyl-2-methyleneindolin of the formula

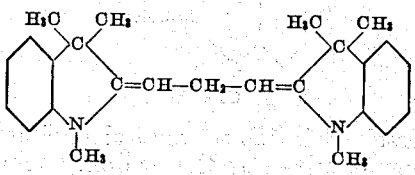

are dissolved in 300–500 parts of beneze and there are added 25 parts of lead peroxide of about 50 per cent. strength and 10 parts of anhydrous calcium chloride. The mixture is heated to gentle boiling, while stirring, and there is then added, drop by drop, a solution of 2.5 parts of glacial acetic acid in 10 parts of benzene. The mixture immediately becomes red. After some time it is filtered hot and the benzene solution is extracted by means of dilute hydrochloric acid and the extract is concentrated. On cooling, the dyestuff of the formula

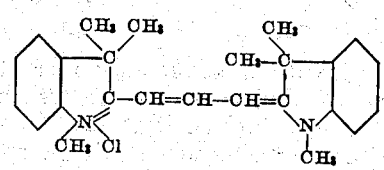

separates in violet red crystals; these are filtered, washed with dilute hydrochloric acid and dried.

The procedure may be varied by filtering the mixture when the condensation is finished and the mass has cooled and extracting the residue with alcohol. From the concentrated extract the dyestuff may be precipitated by means of hydrochloric acid.

Example 4

358 parts of the product of the action of formaldehyde on 1:3:3-trimethyl-2-methyleneindolin of the formula

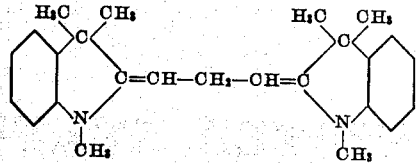

are dissolved in 4000 parts of benzene, while stirring, and the solution is heated to 80° C. There are then added 120 parts of glacial acetic acid and in the course of ¼ hour 100–150 parts of benzoquinone in portions. The oxidation is immediately finished, green crystals separate in very good yield and may be filtered. It may be supposed that the product is an addition product of hydroquinone and 1:3:3:1':3':3'-hexamethyl-streptomonovinylene-2:2'-indocyanineacetate. It dissolves very freely in hot water. By addition of dilute caustic soda solution to its aqueous solution the base of the dyestuff is precipitated. The latter can be converted into its hydrochloride by dissolution in dilute hydrochloric acid; the hydrochloride of the formula

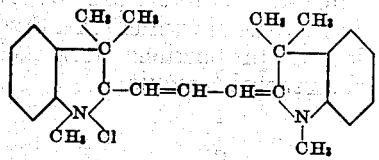

crystallizes from the hot solution in the form of violet crystals.

The hydroquinone remaining in the alkaline filtrate is converted into quinone by one of the usual oxidizing agents and after isolation the quinone can be used again for the oxidizing process.

The oxidation of the product of the action of formaldehyde on 1:3:3-trimethyl-2-methyleneindolin may also be carried out with other quinones, such as 2:6-dichloroquinone.

The dyestuffs from ortho- and para-toluidine yield very pure bluish-red tints on cotton mordanted with tannin.

Example 5

458 parts of the methylenedi-1:3:3-trimethyl-2-methylene-β-naphthindolin of the formula

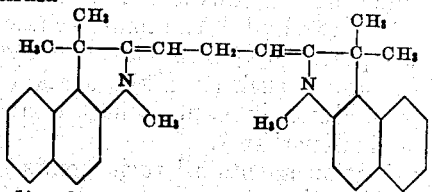

are dissolved in 6200 parts of benzene, and mixed for two hours at 30–35° C. with 50 parts of glacial acetic acid and 100 parts quinone. After stirring for 15–20 hours at the ordinary temperature the formed dyestuff as addition compound with hydroquinone has separated in very good yield. The addition compound of the obtained product with hydroquinone as well as the dyestuff which is obtained therefrom by treatment with dilute alkalies and, after filtration and washing with water, conversion of the separated dyestuff base with aid of dilute hydrochloric acid into the chloride of the formula

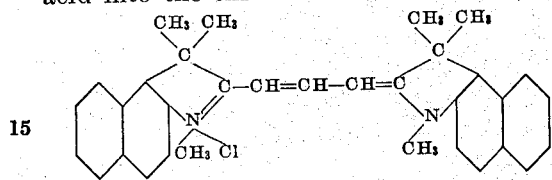

dye tanned cotton in clear violet-blue shades of good fastness.

The use of organic acids, such as acetic acid, formic acid, propionic acid or benzoic acid is not essential, as mineral acids, such as sulfuric acid or hydrochloric acid may be used. In some cases the oxidation proceeds without the addition of an acid.

For the solvents recommended in the examples others can be substituted, such as alcohol, toluene or chlorobenzene without affecting the yield.

What we claim is:—

1. In the manufacture of dyestuffs of the polymethine series, the step which comprises condensing two molecular proportions of a methylene base of the indolenine series of the general formula

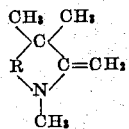

wherein R stands for a benzene or naphthalene radicle, with one molecular proportion of formaldehyde.

2. In the manufacture of dyestuffs of the polymethine series, the step which comprises condensing two molecular proportions of trimethylmethyleneindolin of the formula

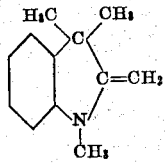

with one molecular proportion of formaldehyde.

3. In the manufacture of dyestuffs of the polymethine series, the step which comprises oxidizing the condensation products of the general formula

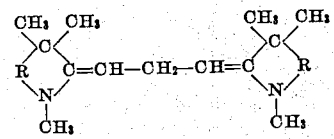

wherein the two R's stand for a benzene or naphthalene radicle, in a medium the pH of which is smaller than 7.

4. In the manufacture of dyestuffs of the polymethine series, the step which comprises the oxidation with quinones of the condensation products of the general formula

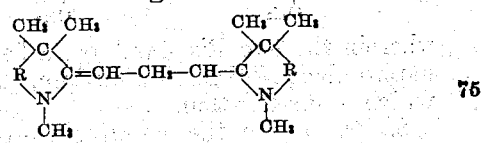

wherein the two R's stand for a benzene or naphthalene radicle, in a medium the pH of which is smaller than 7.

5. In the manufacture of dyestuffs of the polymethine series, the step which comprises the oxidation of the condensation product of the formula

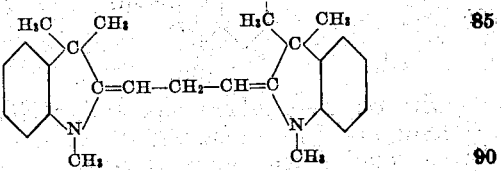

with benzoquinone in a medium the pH of which is smaller than 7.

6. Process for the manufacture of dyestuffs of the polymethine series, consisting in condensing, in a first step, two molecular proportions of a methylene base of the indolenine series of the general formula

wherein R stands for a benzene or naphthalene radicle, with one molecular proportion of formaldehyde, and, in a second step, the oxidation of the condensation product of the general formula

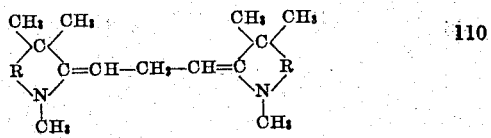

wherein the two R's stand for a benzene or naphthalene radicle, in a medium the pH of which is smaller than 7.

7. Process for the manufacture of dyestuffs of the polymethine series, consisting in condensing, in a first step, two molecular proportions of a methylene base of the indolenine series of the general formula

wherein R stands for a benzene or naphthalene radicle, with one molecular proportion of formaldehyde, and, in a second step, the oxidation with quinones of the condensation products of the general formula

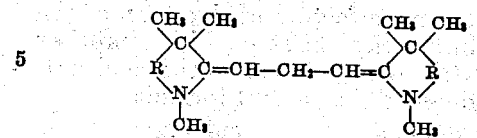

wherein the two R's stand for a benzene or naphthalene radicle, in a medium the pH of which is smaller than 7.

8. Process for the manufacture of a dyestuff of the polymethine series, consisting in condensing, in a first step, two molecular proportions of a methylene base of the indolenine series of the formula

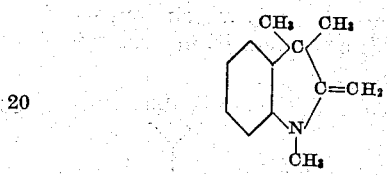

with one molecular proportion of formaldehyde, and, in a second step, the oxidation with benzoquinone of the condensation product of the formula

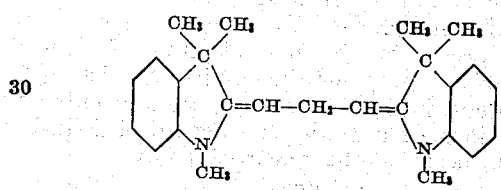

in a medium the pH of which is smaller than 7.

In witness whereof we have hereunto signed our names this 3rd day of May 1929.
RICHARD TOBLER.
WALTER KERN.